United States Patent
Matsushita

(10) Patent No.: US 11,329,972 B2
(45) Date of Patent: May 10, 2022

(54) INFORMATION PROCESSING DEVICE, INFORMATION PROCESSING METHOD, AND PROGRAM

(71) Applicant: NEC Display Solutions, Ltd., Tokyo (JP)

(72) Inventor: Tomoyoshi Matsushita, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 79 days.

(21) Appl. No.: 16/498,195

(22) PCT Filed: Jun. 15, 2017

(86) PCT No.: PCT/JP2017/022133
§ 371 (c)(1),
(2) Date: Sep. 26, 2019

(87) PCT Pub. No.: WO2018/229936
PCT Pub. Date: Dec. 20, 2018

(65) Prior Publication Data
US 2020/0028840 A1  Jan. 23, 2020

(51) Int. Cl.
*H04L 67/141* (2022.01)
*H04L 29/06* (2006.01)

(52) U.S. Cl.
CPC .......... *H04L 63/083* (2013.01); *H04L 67/141* (2013.01)

(58) Field of Classification Search
CPC .................. H04L 63/083; H04L 67/141
See application file for complete search history.

(56) References Cited

U.S. PATENT DOCUMENTS

| | | | | |
|---|---|---|---|---|
| 2010/0107229 A1* | 4/2010 | Najafi | ................. | H04L 63/0838 726/6 |
| 2011/0246778 A1* | 10/2011 | Duane | .................... | G06F 21/57 713/176 |
| 2011/0307822 A1* | 12/2011 | Park | .................... | G06F 3/04883 715/773 |
| 2016/0055826 A1* | 2/2016 | Abe | ...................... | G06F 3/1454 345/2.3 |
| 2016/0080708 A1 | 3/2016 | Urata et al. | | |

FOREIGN PATENT DOCUMENTS

WO  WO 2014/174657  10/2014

OTHER PUBLICATIONS

International Search Report (ISR) (PCT Form PCT/ISA/210), in PCT/JP2017/022133, dated Sep. 12, 2017.
Majhi, Sudip, How to Control GOM Player in Windows from Android or iOS [online], Oxhow, Feb. 14, 2015 [retrieved on Aug. 31, 2017], Retrieved from the Internet: URL:ttps//www.oxhow.com/control-gom-player-in-windows-from-androis-ios/; pp. 1/6-6/6.

* cited by examiner

*Primary Examiner* — Sm A Rahman
(74) *Attorney, Agent, or Firm* — McGinn IP Law Group, PLLC

(57) ABSTRACT

An information processing device makes a communication connection with an external device. The information processing device establishes a service connection with the external device upon determining an input of a determination key from the external device in the determination-key-input-reception time.

17 Claims, 10 Drawing Sheets

INFORMATION PROCESSING DEVICE, INFORMATION PROCESSING METHOD, AND PROGRAM

TECHNICAL FIELD

The present invention relates to an information processing device configured to communicate with a connection request device, an information processing method, and a program.

BACKGROUND ART

When an information processing device like a server device is connected to a connection request device like a terminal device through a communication network, the terminal device may transmit a key like a PIN (Personal Identification Number) to the server device, and therefore the server device may determine whether or not the key matches the information stored therein. Upon detecting a match between the key and the information, the server device may permit a connection to the connection request device. In this connection, Patent Document 1 disclosed a related art, i.e. a technology of facilitating a connection between a terminal device and a projector.

CITATION LIST

Patent Document

Patent Document 1: International Publication Number WO 2014/174657

SUMMARY OF INVENTION

Technical Problem

To determine whether to permit a connection using a key like a PIN, it is necessary for a user to input a PIN having multiple digits, which may increase a working load to input the PIN in an environment requiring connections multiple times. Therefore, it is demanded to provide a technology for facilitating a connection between an information processing device and a connection request device while maintaining good security.

The present invention aims to provide an information processing device, an information processing method, and a program, which can solve the above problem.

Solution to Problem

In a first aspect of the present invention, an information processing device includes an input timing determination part configured to determine whether or not a determination key is input to another device connected to the information processing device in a determination-key-input-reception time, and a connection part configured to establish a service connection with another device when the input timing determination part determines an input of the determination key in the determination-key-input-reception time.

In a second aspect of the present invention, an information processing method serving as a processing method of an information processing device includes the steps of: determining whether or not a determination key is input to another device connected to the information processing device in a determination-key-input-reception time; and establishing a service connection with another device upon determining that the determination key is input in the determination-key-input-reception time.

In a third aspect of the present invention, a program causes a computer of an information processing device to implement an input timing determination means configured to determine whether or not a determination key is input to another device connected to the information processing device in a determination-key-input-reception time, and a connection means configured to establish a service connection with another device when the input timing determination means determines that the determination key is input in the determination-key-input-reception time.

Advantageous Effects of Invention

According to the present invention, it is possible to facilitate a connection between an information processing device and a connection request device while maintaining good security.

DESCRIPTION OF EMBODIMENTS

Hereinafter, an information processing device according to one embodiment of the present invention will be described with reference to the drawings.

Figure 1:
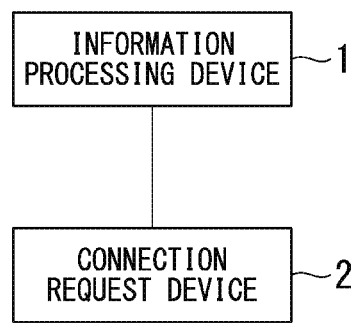
FIG. 1 is a block diagram showing a configuration of an information processing system including an information processing device.

FIG. 1 is a block diagram showing a configuration of an information processing system including the information processing device of the present embodiment.

As shown in FIG. 1, an information processing system 100 includes an information processing device 1 and a connection request device 2, which are connected together to communication with each other. The information processing device 1 and the connection request device 2 can be connected together through a wired network or a wireless network. In the present embodiment, the information processing device 1 may serve as a device configured to provide any serving information to the connection request device 2. The connection request device 2 is a terminal device like a PC (Personal Computer).

FIG. 1 does not show the details of the information processing device 1, which may include a database, a display, and a keyboard. In addition, the connection request device 2 may include a display and a keyboard.

Figure 2:
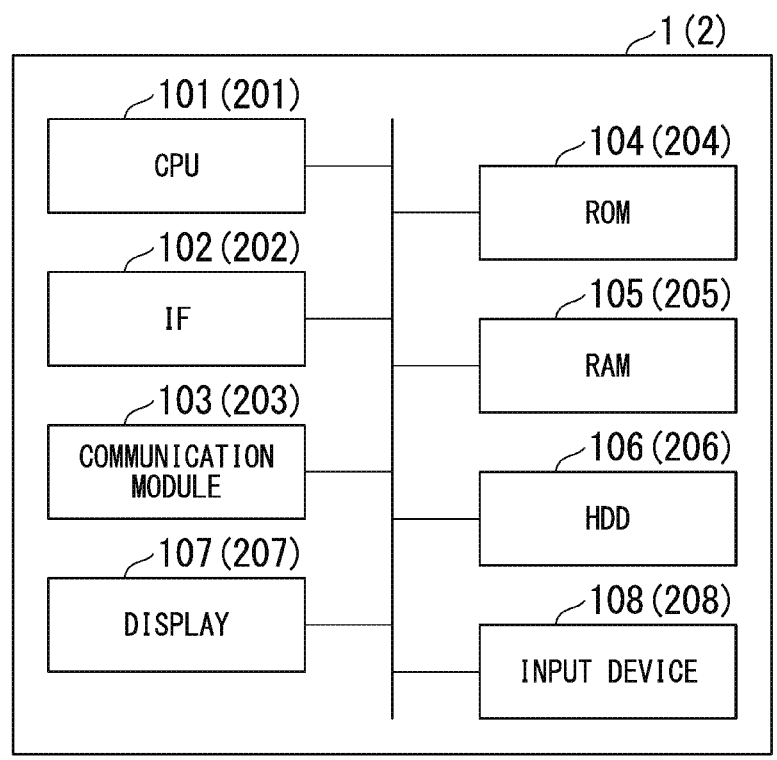
FIG. 2 is a block diagram showing a hardware configuration for a connection request device and the information processing device.

FIG. 2 is a block diagram showing a hardware configuration for the information processing device and the connection request device.

As shown in FIG. 2, the information processing device 1 includes a CPU (Central Processing Unit) 101, an IF (Interface) 102, a communication module 103, a ROM (Read-Only Memory) 104, a RAM (Random-Access Memory) 105, a HDD (Hard Disk Drive) 106, a display 107, and an input device 108 (e.g. a keyboard).

Similarly, the connection request device 2 includes a CPU 201, an IF 202, a communication module 203, a ROM 204, a RAM 205, a HDD 206, a display 207, and an input device 208 (e.g. a keyboard).

Figure 3:
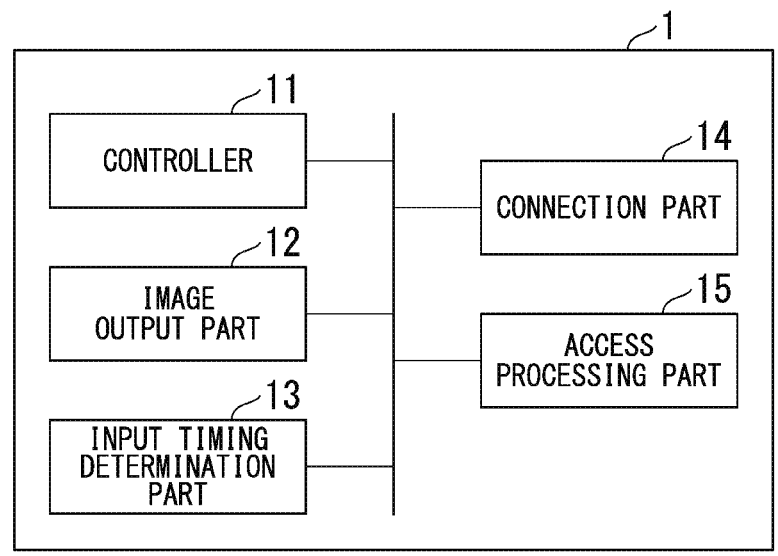
FIG. 3 is a functional block diagram of the information processing device.

FIG. 3 is a functional block diagram of an information processing device.

By executing pre-installed programs with the CPU 101, it is possible to realize functional parts of the information processing device 1 such as a controller 11, an image output part 12, an input timing determination part 13, a connection part 14, and an access processing part 15.

The controller 11 controls other functional parts.

The image output part 12 outputs a key display image.

The input timing determination part 13 determines whether or not a determination key is input to another device configured to communicate with the present device in an input accept period. Specifically, the input timing determination part 13 determines whether or not a determination key is input to the connection request device 2 configured to communicate with the present device in an input accept period included in a key display image displayed on the present device.

The connection part 14 establishes a service connection with the connection request device 2 when the input timing determination part 13 determines an input of a determination key in an input accept period.

The access processing part 15 outputs the access information to the connection request device 2.

The image output part 12 of the information processing device 1 outputs to its display a key display image, which includes an identification of a count start key, an identification of a determination key requesting a user to input until expiration of an input accept period, and the information to display a remaining time up to expiration of an input accept period for accepting a determination key after inputting a count start key.

Figure 4:
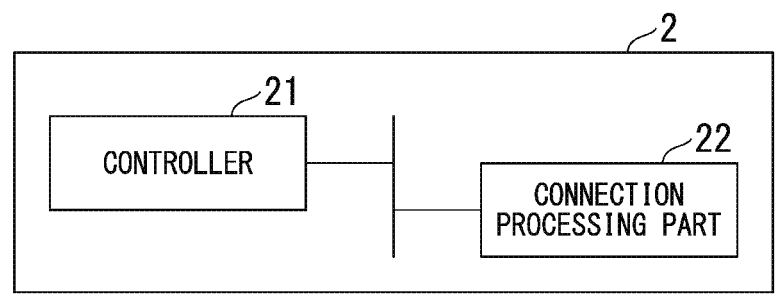
FIG. 4 is a functional block diagram of the connection request device.

FIG. 4 is a functional block diagram of a connection request device.

By executing pre-installed programs with the CPU 201, it is possible to realize functional parts of the connection request device 2 such as a controller 21 and a connection processing part 22.

First Embodiment

Figure 5:
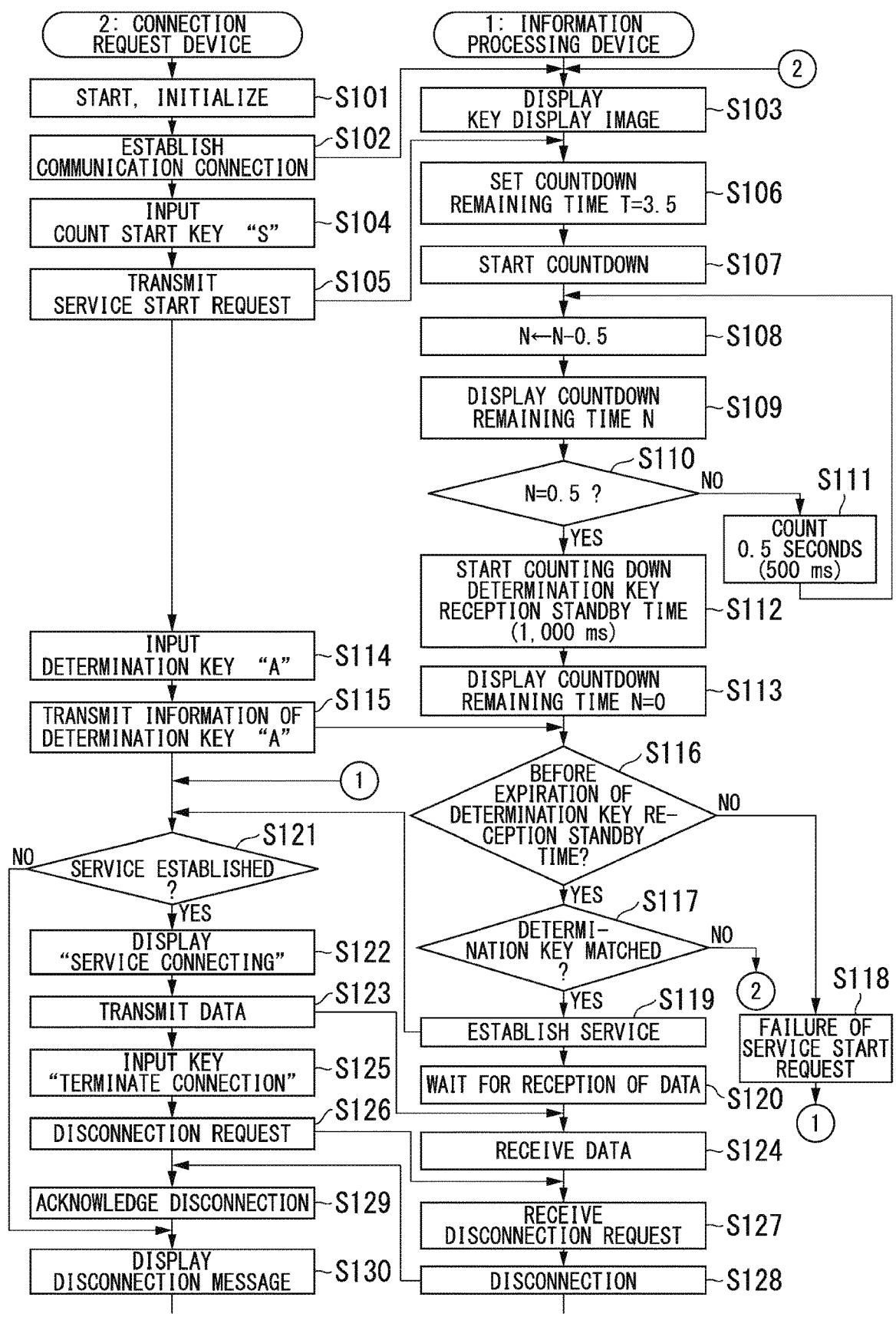
FIG. 5 is a flowchart showing a flow of processes executed by the information processing system according to one embodiment.

FIG. 5 is a flowchart showing a flow of processes executed by the information processing system according to one embodiment.

Next, a flow processes executed by the information processing system will be described below.

A user may operate the connection request device 2 to start and initialize its operation in connection with the information processing device 1, thus logging on to the information processing device 1. This allows the connection request device 2 to start and initialize its operation (step S101). For example, initialization may be rebooting processes or the like. At this time, it is assumed that the connection request device 2 would have established a normal communication connection with the information processing device 1. A communication connection is established using a session key like a SSID which is stored in the connection request device 2 in advance and transmitted to the information processing device 1, and therefore the information processing device 1 determines whether its own SSID stored thereon matches the SSID transmitted thereto. Upon detecting a match between SSIDs, a communication connection is established between the information processing device 1 and the connection request device 2 (step S102). In this condition, the image output part 12 of the information processing device 1 displays a key display image 51 on a display 107 connected thereto (step S103). In this connection, it is assumed that a user of the connection request device 2 may be located in an environment to browse the key display image 51 displayed on the display 107 connected to the information processing device 1.

Figure 6:
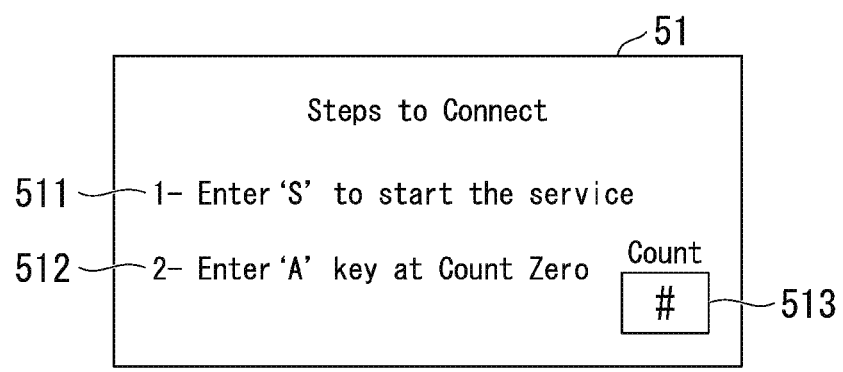
FIG. 6 is an image diagram showing a first example of a key display image.

FIG. 6 is an image diagram showing a first example of a key display image.

As shown in FIG. 6, the key display image 51 causes the display 107 of the connection request device 2 to display the display information 511 indicating a count start key "S" to input a count start instruction to count time up to a reference timing to input a determination key, the display information 512 indicating a determination key "A" to input at the reference timing, and the display information 513 indicating a remaining time until the reference timing to input a determination key after inputting a count start key "S".

A user of the connection request device 2 may recognize a count start key "S" with reference to the key display image 51 displayed on the display 107 connected to the information processing device 1, wherein the user should input the count start key "S" to log on to the information processing device 1 (step S104). In this connection, the information processing device 51 normally displays the same key "S" as the count start key "S" included in the key display image 51. Upon detecting an input of the count start key "S", the connection processing part 22 of the connection request device 2 transmits a service start request to the information processing device 1 (step S105).

Upon receiving a service start request, the controller 11 of the information processing device 1 instructs the image output part 12 to starting counting time. Upon receiving a count start instruction, the image output part 12 sets a countdown remaining time, representing a standby terminate time to terminate a standby condition for an input of a determination key "A" after an input of a count start key, to 3.5 seconds. That is the image output part 12 sets a countdown remaining time N=3.5 seconds (step S106). The image output part 12 starts counting down time (step S107).

The image output part 12 sequentially displays remaining times until the reference timing to input a determination key after an input of a count start key. That is, the image output part 12 carries out a calculation of "N−0.5" every time 0.5 seconds have elapsed (step S108). The image output part 12 displays the countdown remaining time N every 0.5 seconds as the remaining time display information 513 in the key display image 51 (step S109). The image output part 12 determines whether the countdown remaining time becomes equal to N=0.5 (step S110). If "NO", the image output part 12 counts the next 0.5 seconds (i.e. 500 ms) (step S111).

If "YES", the input timing determination part 13 of the information processing device 1 starts counting down a determination-key-reception-standby time to accept an input of a determination key (step S112). The determination-key-reception-standby time is set to one second (i.e. 1,000 ms) representing an acceptance time to accept an input of a determination key. Although the countdown remaining time is set to 3.5 seconds, an actual time limit for the information processing device 1 to accept an input of a determination key may be permitted up to 4.5 seconds after an input of a count start key. The image output part 12 displays the countdown remaining time N=0 as the remaining time display information 513 in the key display image 51 upon a lapse of 0.5 seconds after step S108 (step S113).

Upon recognizing the countdown remaining time N=0 displayed on the display 107 of the information processing device 1, a user of the connection request device 2 inputs a determination key "A" using the input device 108 of the connection request device 2. The connection processing part 22 of the connection request device 2 accepts an input of the determination key "A" (step S114). The connection processing part 22 transmits the information of the determination key "A" to the information processing device 1 (step S115).

Upon receiving a determination key, the input timing determination part 13 of the information processing device 1 determines whether it receives the determination key until expiration of a determination-key-input-accept time (step S116). This process is one manner of a determination process to determine whether or not a determination key is input to the connection request device 2 in a determination-key-input-accept time displayed in the key display image 51. If "YES" in step S116, the connection part 14 determines whether the determination key matches the determination key stored in the information processing device 1 (step S117). It is possible for the image output part 12 to randomly change the determination key displayed in the key display image 51 since the information processing device 1 includes a storage configured to store the determination key displayed in the key display image 51. The connection part 14 determines whether the pre-stored determination key matches the determination key input to the connection request device 2.

Upon determining that the determination key firstly received by the information processing device 1 in step S117 does not match the pre-stored determination key, the connection part 14 immediately notifies the connection request device 2 that a service start request will not be established, and then the connection part 14 stops counting down time and instructs the controller 11 to restore the initial condition of step S103 to display the key display image 51. Accordingly, it is possible to prevent unauthorized logon events due to reception of many keys coming from a large number of unidentified devices each serving as the connection request device 2.

If "NO" in step S116, it is determined that an input of a determination key has not been made until expiration of the determination-key-receive-standby time. If "NO" in step S117, it is determined that the input determination key does not match the pre-stored determination key. If "NO" in step S116 or "NO" in step S117, the connection part 14 notifies the connection request device 2 that a service start request will not be established (step S118). On the other hand, if "YES" in step S117, the connection part 14 permits a service start request to notify the connection request device 2 of a service establishment (step S119). The information processing device 1 waits for reception of data from the connection request device 2 (step S120).

The connection processing part 22 of the connection request device 2 determines whether a service is established (step S121). Due to a service establishment, the connection processing part 22 controls the display 207 of the connection request device 2 to display a message "service being connected". The connection processing part 22 of the connection request device 2 and the access processing part 15 of the information processing device 1 may transmit or receive data relating to various services (steps S123, S124). To terminate a service, a user of the connection request device 2 makes an input of a "connection end" key using the input device 208 attached to the connection request device 2 (step S125). The "connection end" key may be an "Esc" key included in a keyboard serving as the input device 208. Upon detecting an input of a "connection end" key, the connection processing part 22 of the connection request device 2 transmits a disconnection request to the information processing device 1 (step S126).

The information processing device 1 receives a disconnection request (step S127). Subsequently, the access processing part 15 of the information processing device 1 transmits a disconnection signal to the connection request device 2 (step S128). The connection processing part 22 of the connection request device 2 makes a connection acknowledgement (step S129). In addition, the connection processing part 22 displays a disconnection message indicating disconnection on the display 207 of the connection request device 2 (step S130).

Figure 7:
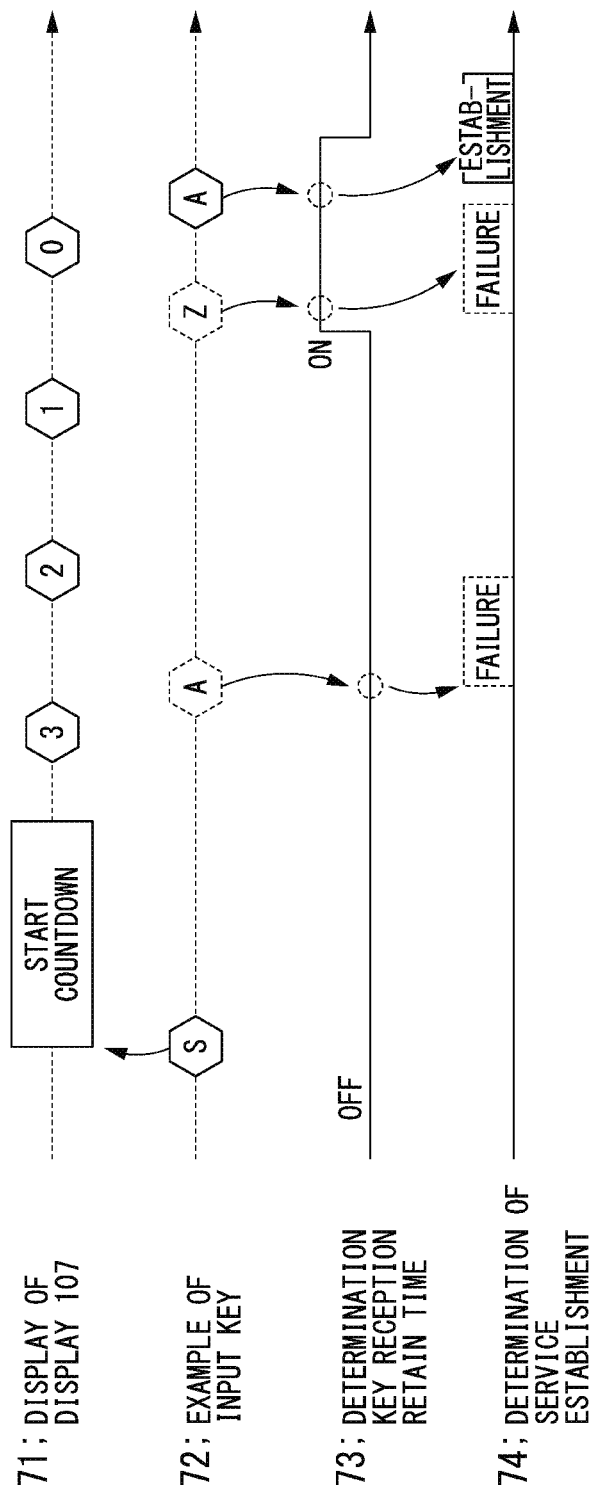
FIG. 7 is a first diagram showing timing charts of processes executed by the information processing device and the connection request device.

FIG. 7 is a first diagram showing timing charts of processes executed by the information processing device 1 and the connection request device 2.

FIG. 7 shows timing charts relating to four axes which are drawn from the top to the bottom in the drawing sheet and which include a first axis 71 showing the timing to display the key display image 51 on the display 107 of the information processing device 1, a second axis 72 showing the timing to input keys, a third axis 73 showing ON or OFF of a determination-key-reception-standby time, and a fourth axis 74 showing the result of determining a service establishment. FIG. 7 shows arrows directing to the latest time t along the four axes in timing charts.

Due to the aforementioned processes, when a user presses a count start key "S" as shown in FIG. 7, a countdown operation is started in the key display image 51 displayed on the display 107 of the information processing device 1. The countdown operation may sequentially display numbers such as "3", "2.5", "2", "1.5", "1", "0.5", and "0" on screen. For the sake of simplifying descriptions, only the four numbers "3", "2", "1", and "0" are simply shown along the first axis 71 in FIG. 7.

Despite an input of the key "A" along the second axis 72 after the countdown number "3" displayed in the key display image 51, the connection part 14 determines that a service start request is unestablished along the fourth axis 74 since a determination-key-reception-standby time has not been started along the third axis 73. In this connection, the connection part 14 may validate acceptance of only the determination key transmitted from the connection request device 2 at the timing close to the countdown number "0"; hence, the connection part 14 may not respond to the determination key even when properly inputted before the timing.

When the countdown number becomes equal to "0.5" in the key display image 51, the connection part 14 starts counting (or turning on) the determination-key-reception-standby time along the third axis 73, and then a user may input a key "Z" along the second axis 72. In this period for counting the determination-key-reception-standby time, however, the connection part 14 determines that a service start request is unestablished along the fourth axis 74 since the key "Z" does not match the determination key "A".

The determination-key-reception-standby time will be further continued for 0.5 seconds after the countdown number is turned to "0" in the key display image 51. A user may input a key "A" along the second axis 72 in a period for still counting the determination-key-reception-standby time after the countdown number is turned to "0". In this period for still counting the determination-key-reception-standby time, the connection part 14 determines that a service start request is established along the fourth axis 74 since the input key "A" matches the determination key "A".

One embodiment of the present invention has been described above. The aforementioned processes allow a user of the connection request device 2 to input a determination key in synchronism with the timing at which the countdown number becomes equal to zero in the key display image 51 displayed on the display 107 of the information processing device 1. This makes it possible for the user to connect the information processing device 1 and the connection request device 2 with a simple operation. This eliminates the necessity of inputting multiple-digits numbers like a PIN; hence, the present embodiment can reduce a workload of a user to connect the information processing device 1 and the connection request device 2 together.

The aforementioned processes may prevent a user from recognizing a determination key without visually recognizing a determination key included in the key display image 51 on the display 107 of the information processing device 1. Accordingly, even when a determination key includes a single character, any person who is not located to visually recognize the display 107 of the information processing device 1 cannot estimate a determination key or cannot grasp the reference timing to input a determination key. This makes it difficult for any person to make an unauthorized access to the information processing device 1. Therefore, the methodology of the present embodiment may provide a connection method for the information processing device 1 and the connection request device 2 with improved security.

The aforementioned processes relate to an example to urge a user to input the count start key "S". However, the connection request device 2 may operate without accepting an input of the count start key "S" such that upon establishing a communication connection in step S102 after startup and initialization in step S101, the connection request device 2 can immediately transmit a service start request to the information processing device 1 as described in step S105.

According to the aforementioned processes, it is possible for the connection part 14 of the information processing device 1 to discard the determination key when the reception time to receive the determination key comes after completion of counting the determination-key-reception-standby time. The aforementioned processes set the determination-key-receive-standby time to 1,000 milliseconds, but it is possible to reduce the determination-key-receive-standby time so as to further reduce a possibility of making an unauthorized access by a third party other than a service user.

Figure 8:
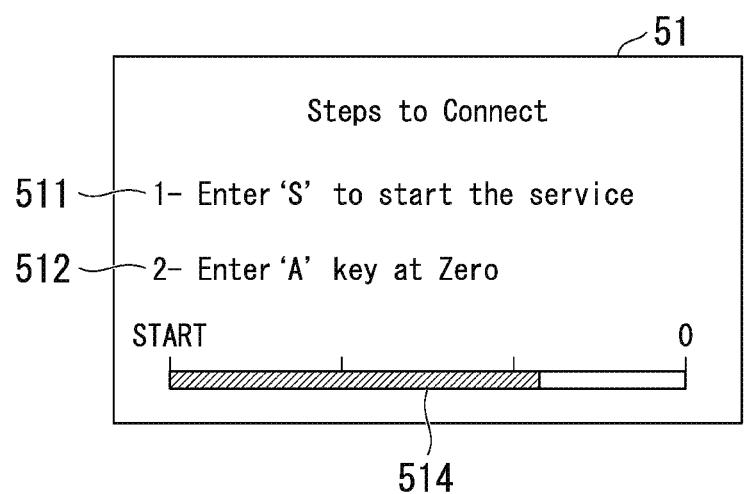
FIG. 8 is an image diagram showing a second example of a key display image.

FIG. 8 is an image diagram showing a second example of a key display image.

Similar to the key display image 51 shown in FIG. 6, the key display image 51 shown in FIG. 8 displays the display information 511 indicating the count start key "S" to input a count start instruction to count time until the reference timing for an input of a determination key, and the display information 512 indicating the determination key "A" to input in synchronism with the reference timing. The key display image 51 of FIG. 8 differs from the key display image 51 of FIG. 6 in terms of an indicator 514 (a graphical chart) indicating the remaining time up to the reference timing for an input of a determination key after inputting the count start key "S". For example, the indicator 514 has a memory configured to indicate the remaining time such as three-seconds remaining, two-seconds remaining, one-second remaining, and zero-seconds remaining. The image output part 12 controls the indicator 514 to move its memory position corresponding to a boundary between a highlighted part and a dark part at each timing corresponding to the countdown remaining time N=3, 2, 1, and 0.

Since the key display image 51 shown in FIG. 8 is displayed on the display 107 of the information processing device 1, a user may press a determination key using the input device 208 of the connection request device 2 in synchronism with the timing at which a boundary between a highlighted part and a dark part becomes close to "0". It is visually easy for a user to determining the timing to press a determination key by looking at the key display image 51 of FIG. 8 rather than the key display image 51 of FIG. 6. Accordingly, it is possible to determine the timing to press a determination key with ease even when the determination-key-reception-standby time is reduced, in other words, it is possible to improve a security level by reducing the determination-key-reception-standby time.

Second Embodiment

Figure 9:
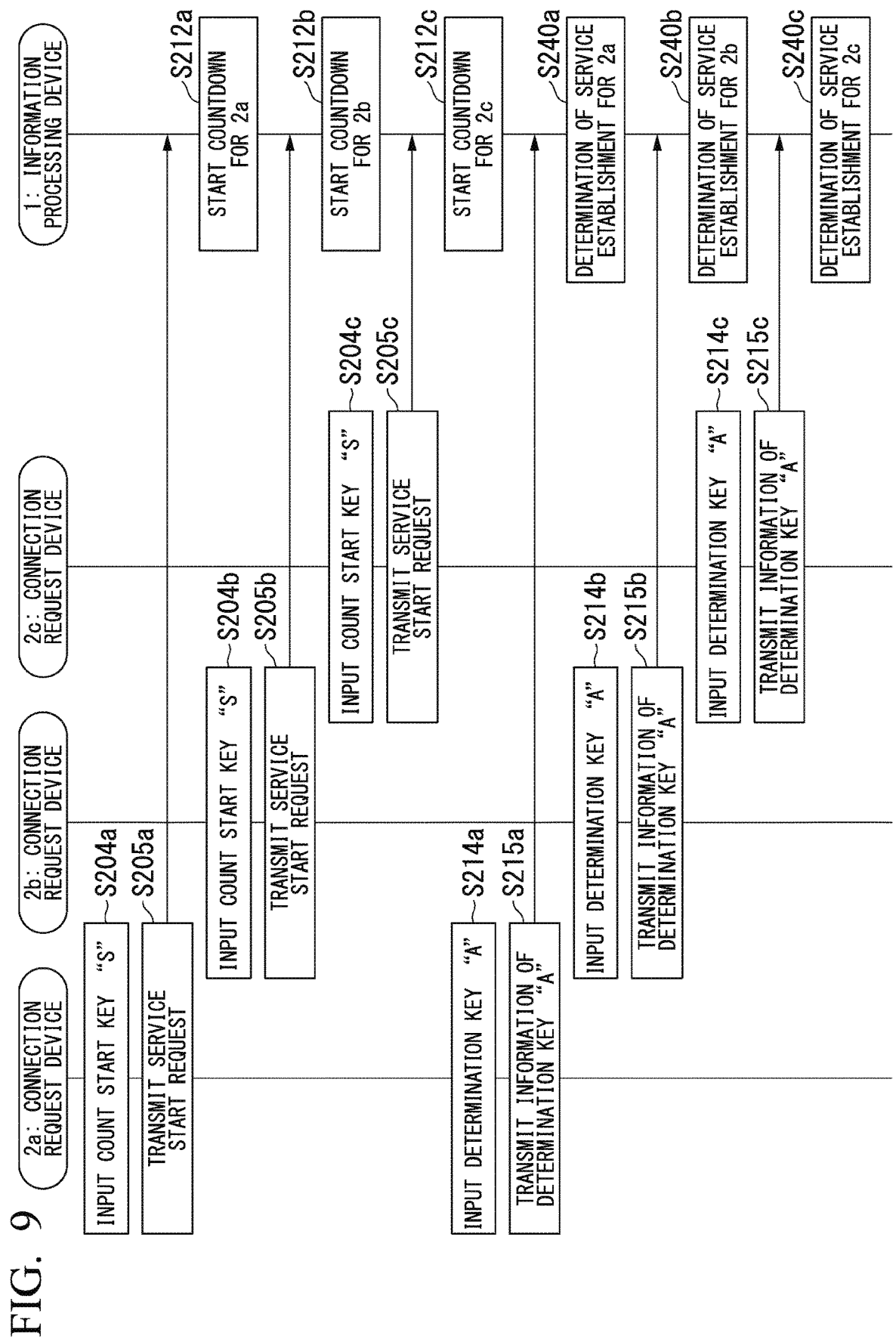
FIG. 9 is a sequence diagram showing a flow of processes executed by an information processing system according to a second embodiment.

FIG. 9 is a sequence diagram showing a flow of processes executed by an information processing system according to the second embodiment.

Next, the information processing system of the second embodiment will be described below.

FIG. 9 shows that three devices, i.e. a connection request device 2a, a connection request device 2b, and a connection request device 2c, make requests to access services provided to the information processing device 1. The connection request device 2a, the connection request device 2b, and the connection request device 2c will be collectively referred to as the connection request devices 2.

When connected with a plurality of connection request devices 2, the information processing device 1 outputs to the display 107 connected thereto a plurality of key display images 51 corresponding to the connection request devices 2 independently. The key display images 51 are assigned IDs of their corresponding connection request devices 2. A user handling each connection request device 2 may confirm the key display image 2 corresponding to the user's own connection request device 2. Subsequently, a user handling each connection request device 2 inputs the count start key "S" into the user's own connection request device 2 (steps S204a, S204b, S204c). Each connection request device 2 transmits a service start request (step S205a, S205b, S205c).

The input timing determination part 13 of the information processing device 1 starts to display countdown indications representative of the determination-key-reception-standby time included in the key display images 51 at different timings to receive service start requests from the connection request devices 2 (step S112a, step S112b, step S112c).

A user handling each connection request device 2 may input the determination key "A" using the input device 108 of each connection request device 2 upon recognizing that the countdown remaining time becomes zero in the key display image 51 corresponding to the user's own connection request device 2 among a plurality of key display images 51 displayed on the display 107 of the information processing device 1 (step S214a, step S214b, step S214c). Upon detecting an input of the determination key "A", the connection processing part 22 of the connection request device 2 transmits the determination key information to the information processing device 1 (step S215a, step S215b, step S215c).

Upon receiving a plurality of determination key information relating to the determination key "A" from the connection request devices 2, the information processing device 1 determines whether to establish services at different timings (step S240a, step S240b, step S240c). The processes of steps S240a, S240b, S240c for determining establishment of services correspond to the foregoing processes of steps S116 to S119 in the first embodiment.

According to the aforementioned processes, the information processing device 1 may carry out the foregoing processes of the first embodiment in parallel with respect to the connection request devices 2 independently.

Third Embodiment

Figure 10:
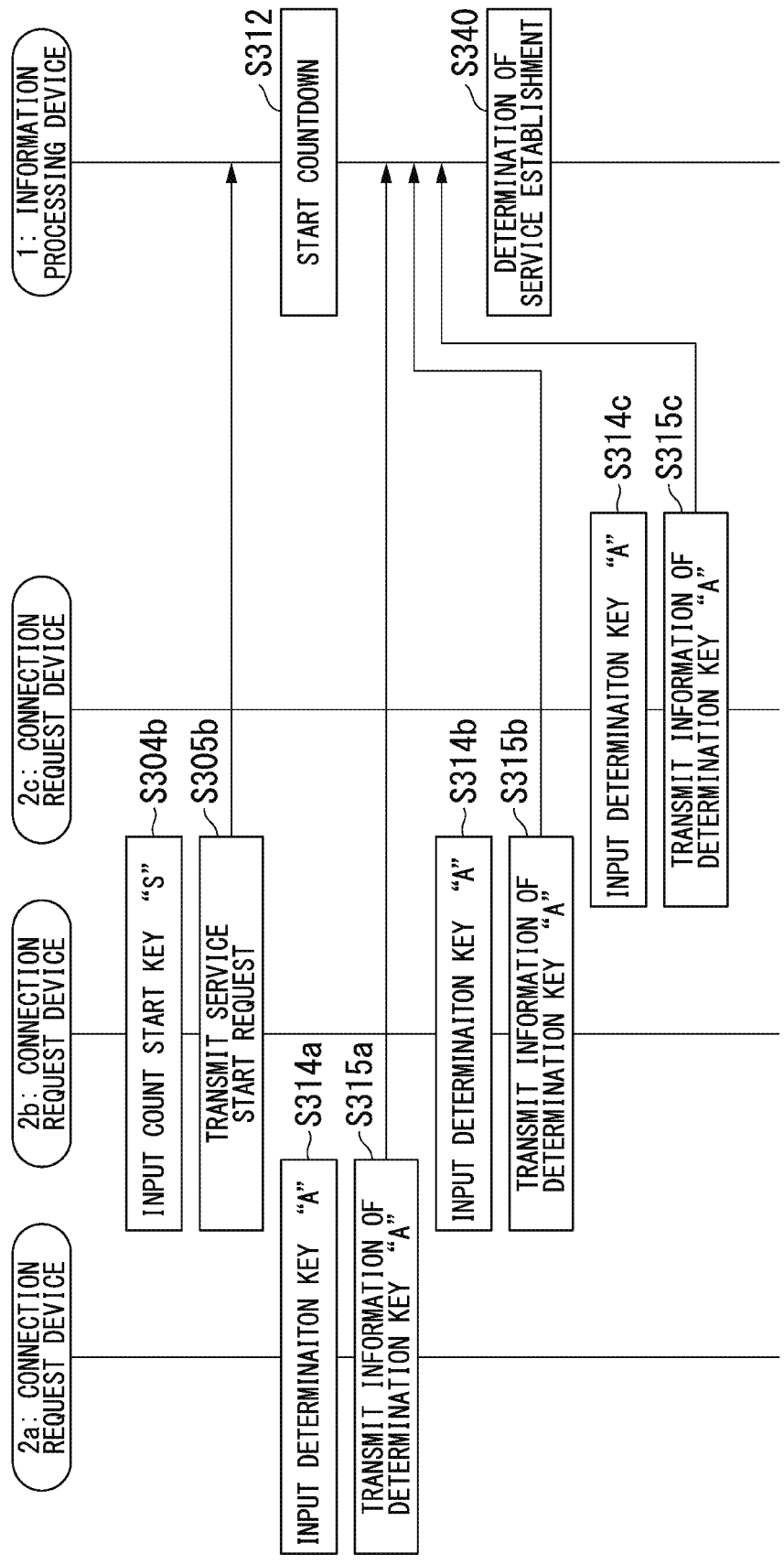
FIG. 10 is a sequence diagram showing a flow of processes executed by an information processing system according to a third embodiment.

FIG. 10 is a sequence diagram showing a flow of processes executed by an information processing system according to the third embodiment.

Next, the processes executed by the information processing system of the third embodiment will be described below.

According to the foregoing processes of the information processing system of the second embodiment, a plurality of key display images 51 corresponding to the connection request devices 2 are displayed on the display 107 of the information processing device 1. When users of the connection request devices 2 input the count start key "S" at significantly different timings, some connection request devices 2 may succeed to establish services to thereby indicate currently connected conditions services, and then another connection request device 2 may make a request to access a new service provided by the information processing device 1. In this case, the information processing device 1 needs to display the key display image 51 for another connection request device 2 again.

It is assumed that a plurality of users handling their connection request devices 2 cooperate together to carry out cooperative operations while looking at a plurality of service information displayed on the display 107 installed in the information processing device 1. In this case, when another connection request device 2 makes a request to access a new service provided by the information processing device 1, according to the foregoing processes of the second embodiment, the information processing device 1 needs to output a new key display image for another connection request device 2 making a new access request to be overlapped with the service information to the display 107. Every time a new user makes a new access request, the information processing device 1 needs to display a new key display image on the display 107, which may disturb progression of cooperative operations. For this reason, it is preferable that all the user should complete processes to establish services in advance before starting cooperative operations by users based on the service information. To complete processes to establish services before implementing cooperative operations based on the service information, it may take a long time to complete establishing services with all the connection request devices 2 if many users request access to services.

The information processing system of the third embodiment is configured to easily establish services for all users requesting access to services, in other words, the third embodiment provides a method to reduce the entire time to complete establishing services.

In the third embodiment, as shown in FIG. 10, three devices, i.e. the connection request device 2a, the connection request device 2b, and the connection request device 2c, make requests to access services provided by the information processing device 1. In the third embodiment similar to the second embodiment, the connection request device 2a, the connection request device 2b, and the connection request device 2c will be collectively referred to as the connection request devices 2. The third embodiment is designed to eliminate the time and labor of the second embodiment, in which the information processing device 1 needs to execute processes in response to the service start requests made by all the connection request devices 2 in parallel, such that the information processing device 1 controls any one of connection request devices 2 to make a service start request. Herein, it is assumed that each connection request device 2 may establish a normal communication connection with the information processing device 1. For example, the information processing device 1 should execute processes responsive to a service start request made by the connection request device 2a which is a first connection request device 2 to make the earliest service start request. In this case, the input timing determination part 13 of the information processing device 1 starts to count down the determination-key-reception-standby time with respect to a single key display image 51 displayed on the display 107 (step S312).

Upon recognizing that the countdown remaining time N becomes zero in a single key display image 51 displayed on the display 107 of the information processing device 1, a user of each connection request device 2 inputs the determination key "A" using the input device 108 (step S314a, step S314b, step S314c). After inputting the determination key "A", the connection processing part 22 of each connection request device 2 transmits the determination key information to the information processing device 1 (step S315a, step S315b, step S315c).

The information processing device 1 determines whether to establish a service upon receiving the information of the determination key "A" from each connection request device 2 until expiration of the determination-key-input-reception time based on the countdown start timing in step S312 (step S340). The process of the service-establishment-determination step S340 corresponds to the foregoing processes of steps S116 to S119 in the first embodiment.

Figure 11:
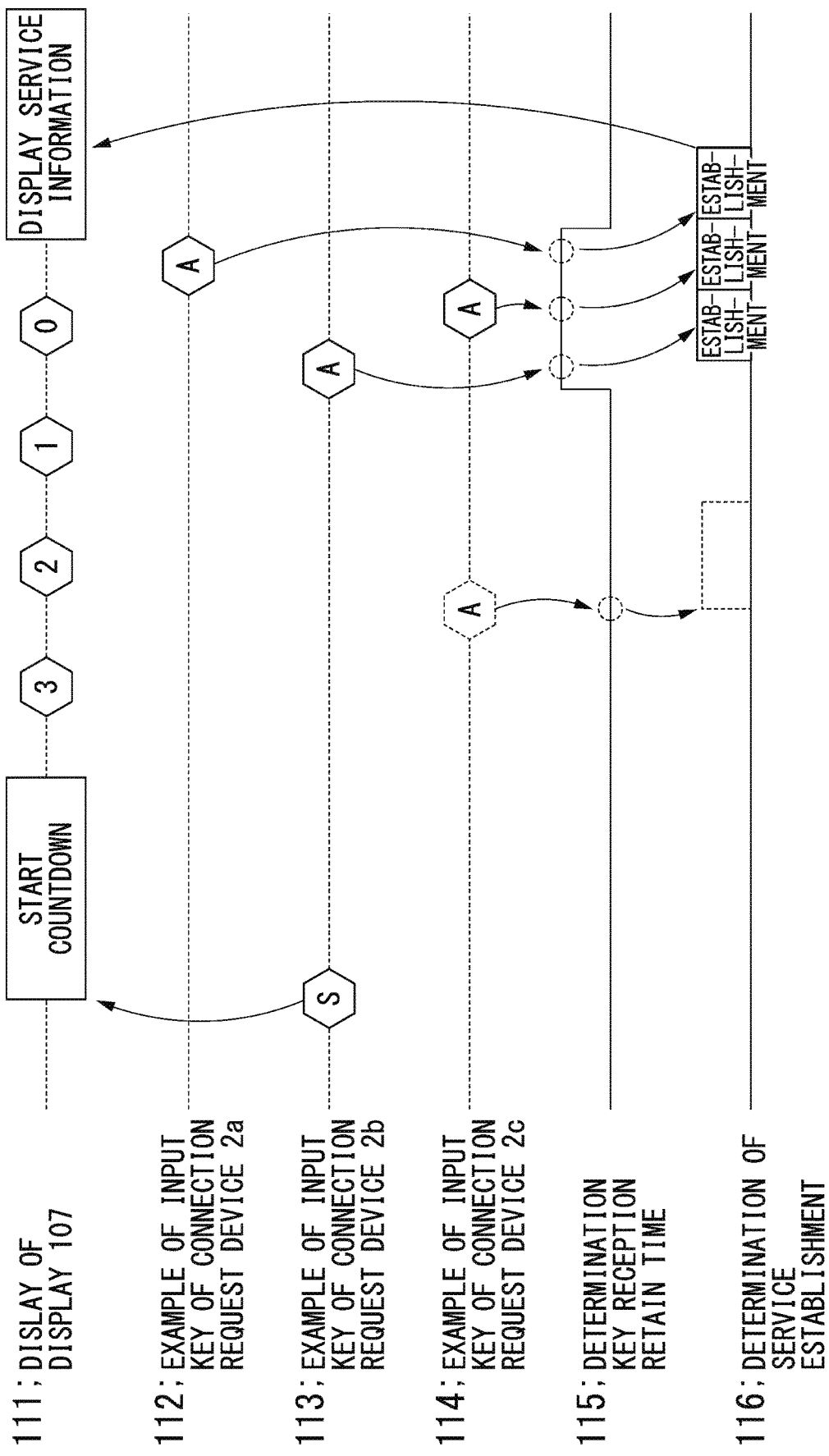
FIG. 11 is second diagram showing timing charts of processes executed by the information processing device and the connection request device.

FIG. 11 is a second diagram showing timing charts of processes executed by the information processing device 1 and the connection request device 2.

FIG. 11 shows timing charts relating to six axes which are drawn from the top to the bottom in the drawing sheet and which include a first axis 111 to display the key display image 51 on the display 107 installed in the information processing device 1, a second axis 112 indicating a key input timing of the connection request device 2a, a third axis 113 indicating a key input timing of the connection request device 2b, a fourth axis 114 indicating a key input timing of the connection request device 2c, a fifth axis 115 indicating ON and OFF of the determination-key-reception-standby time, and a sixth axis 116 indicating the result of establishing services. FIG. 11 shows arrows directing to the latest time t along the six axes of timing charts.

Similar to the aforementioned descriptions relating to FIG. 7, when a user presses the count start key "S" in the connection request device 2b as shown in FIG. 11, the information processing device 1 displays the key display image 51 to start counting down time on the display 107. In a countdown operation, numbers such as "3", "2.5", "2", "1.5", "1", "0.5", and "0" are sequentially displayed in the key display image 51. For the sake of simplifying explanation, only the four numbers such as "3", "2", "1", and "0" are simply shown along the first axis 111 in FIG. 11.

When a user inputs the key "A" in the connection request device 2c along the fourth axis 114 after the countdown number "3" is shown in the key display image 51, the connection part 14 determines that a service start request would not be established along the sixth axis 116 since the determination-key-reception-standby time has not been started on the fifth axis 115. In this connection, the connection part 14 may validate reception of only the determination key transmitted from the connection request device 2 at the timing close to the countdown number "0", but the connection part 14 may not respond to the determination key even when the determination key is properly inputted before the timing.

It is assumed that a user may input the key "A" into each of the connection request devices 2a, 2b, and 2c along the second axis 112, the third axis 113, and the fourth axis 114 at the timing close to the countdown number "0". In this case, the connection part 14 may determine to establish services along the sixth axis 116 with respect to the connection request device 2a, 2b, and 2c since the input key "A" matches the determination key "A" while the determination-key-reception-standby time is currently being counted.

According to the aforementioned processes, the information processing device 1 may concurrently receive the determination keys from a plurality of connection request devices 2 so as to carry out the parallel processing at the timing close to the countdown number "0", which is started to be counted down at the reference timing of step S312. Since a plurality of service start requests from a plurality of connection request devices 2 are concurrently received by the information processing device 1, it is possible for all the connection request devices 2 to realize simply access to services. In addition, it is possible to simplify the processing of the information processing device 1 by way of the aforementioned processes.

Figure 12:
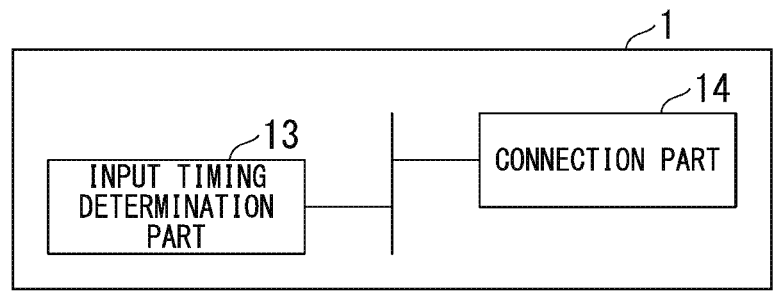
FIG. 12 is a block diagram showing a minimum configuration of an information processing device.

FIG. 12 is a block diagram showing a minimum configuration of an information processing device.

As shown in FIG. 12, the information processing device 1 should include at least the input timing determination part 13 and the connection part 14.

The input timing determination part 13 determines whether or not a determination key is input to another device connected to the information processing device 1 (e.g. the connection request device 2) in the determination-key-input-reception time.

The connection part 14 is configured to establish a service connection with another device when the input timing determination part 13 determines an input of a determination key in the determination-key-input-reception time.

All the aforementioned devices include computer systems. Herein, programs causing the foregoing processes to be executed by each device are stored on computer-readable storage media installed in each device, whereby each device may read and execute programs to achieve the foregoing processes. The term "computer-readable storage media" may include magnetic disks, magneto-optical disks, CD-ROM, DVD-ROM, semiconductor memory, and the like. In addition, it is possible to distribute computer programs to computers through communication lines, and therefore computers may receive and execute computer programs.

The foregoing programs may partially achieve the functions implemented by functional parts. In addition, the foregoing programs may be differential files (or differential programs), which can be combined with pre-installed programs of computer systems to implement the foregoing functions.

REFERENCE SIGNS LIST

1 . . . information processing device
2 . . . connection request device
11 . . . controller
12 . . . image output part
13 . . . input timing determination part
14 . . . connection part
15 . . . access processing part
21 . . . controller
22 . . . connection processing part
51 . . . key display image

The invention claimed is:

1. An information processing device, comprising:
an image output configured to output an image representing a determination key and being before the determination-key-input-reception time and another image representing being in the determination-key-input-reception time, wherein the image and the another image are displayed on a display;
an input timing determination part configured to determine an input of the determination key to an external device in the determination-key-input-reception time; and
a connection part configured to establish a service connection with the external device when the input timing determination part determines the input of the determination key in the determination-key-input-reception time.

2. The information processing device according to claim 1, wherein the image output outputs to the display the image including an identification of a count start key indicating an input of a count start instruction until expiration of the determination-key-input-reception time, an identification of the determination key requesting an input of the determination key until expiration of the determination-key-input-reception time, and a remaining time until a reference timing of the determination-key-input-reception time after the input of the count start key, and
wherein the input timing determination part determines the input of the determination key before the expiration of the determination-key-input-reception time after the input of the count start key.

3. The information processing device according to claim 2, wherein the image output outputs the image indicating a number representing the remaining time until the reference timing of the determination-key-input-reception time after the input of the count start key.

4. The information processing device according to claim 2, wherein the image output outputs the image indicating a graphical chart representing the remaining time until the reference timing of the determination-key-input-reception time after the input of the count start key.

5. The information processing device according to claim 1, wherein the input timing determination part determines the input of the determination key from each external device among a plurality of external devices in the determination-key-input-reception time.

6. The information processing device according to claim 1, further comprising an access processor configured to output access information to the plurality of external devices in common.

7. An information processing method, comprising:
outputting an image representing a determination key and being before the determination-key-input-reception time and another image representing being in the determination-key-input-reception time, wherein the image and the another image are displayed on a display;
determining an input of the determination key to an external device in the determination-key-input-reception time; and
establishing a service connection with the external device.

8. The information processing device according to claim 1, wherein the determination key is a single character.

9. The information processing method according to claim 7, wherein the determination key is a single character.

10. An information processing device, comprising:
an image output configured to output an image representing a determination key and being before the determination-key-input-reception time and another image representing being in the determination-key-input-reception time, wherein the image and the another image are displayed on a display; and
a processor coupled to a memory storing instructions, the processor being configured to:
determine an input of the determination key to an external device in the determination-key-input-reception time; and
establish a service connection with the external device when the processor determines the input of the determination key in the determination-key-input-reception time.

11. The information processing device according to claim 10, wherein the determination key is a single character.

12. The information processing device according to claim 10, wherein the image output outputs to the display the image including an identification of a count start key indicating an input of a count start instruction until expiration of the determination-key-input-reception time, an identification of the determination key requesting an input of the determination key until expiration of the determination-key-input-reception time, and a remaining time until a reference timing of the determination-key-input-reception time after the input of the count start key.

13. The information processing device according to claim 12, wherein the processor determines the input of the determination key before the expiration of the determination-key-input-reception time after the input of the count start key.

14. The information processing device according to claim 13, wherein the image output outputs the image indicating a number representing the remaining time until the reference timing of the determination-key-input-reception time after the input of the count start key.

15. The information processing device according to claim 13, wherein the image output outputs the image indicating a graphical chart representing the remaining time until the reference timing of the determination-key-input-reception time after the input of the count start key.

16. The information processing device according to claim 10, wherein the processor determines the input of the determination key from each external device among a plurality of external devices in the determination-key-input-reception time.

17. The information processing device according to claim 10, wherein the processor is configured to output access information to the plurality of external devices in common.

* * * * *